Sept. 3, 1929.  G. C. JETT  1,727,012
CORN PICKING AND HUSKING MACHINE
Filed May 31, 1923   5 Sheets-Sheet 1

INVENTOR:
George C. Jett.
BY:
ATTORNEY.

Patented Sept. 3, 1929.

1,727,012

UNITED STATES PATENT OFFICE.

GEORGE C. JETT, OF MILWAUKEE, WISCONSIN, ASSIGNOR TO RUNGE CORN HARVESTER COMPANY, OF MILWAUKEE, WISCONSIN, A CORPORATION OF WISCONSIN.

CORN PICKING AND HUSKING MACHINE.

Application filed May 31, 1923. Serial No. 642,481.

This invention relates to corn picking and husking machines.

One object of the present invention is to simplify and otherwise improve the construction and operation of machines for this purpose.

A more specific object is to reduce the size and weight of such machines to thereby render the same better adapted for travel over the uneven and unpacked earth in the field. This is accomplished by a novel grouping and arrangement of parts by which the number of parts may be materially reduced and the width of the machine confined within narrow limits.

Another object is the provision of stalk gathering means flexibly mounted in such manner as to permit the same to closely follow irregularities in the ground surface. By mounting the gathers in this manner they may be maintained very close to the ground surface, without danger of actually digging into the earth, thereby making it possible to pick up the fallen stalks and directing the same to the machine.

Another object is to provide a novel arrangement of parts by which the ears of corn removed from the snapping rolls may be automatically passed to the husking rolls with a minimum amount of mechanical handling.

Another object is the provision of improved means for presenting or applying the ears of corn to the husking rolls.

Another object is the provision of novel and improved means for ejecting the husks and other waste from the machine.

Another object is the provision of means for insuring a clear passage of the stalks through the machine without danger of interference with the operating parts.

Another object is the provision of new and improved means for reclaiming or salvaging the grain that may become loose from the ears during the picking or husking operations.

Other objects and advantages will appear from the following description of an illustrative embodiment of the present invention.

The machine selected for illustration comprises a relatively narrow frame including a pair of side bars U extending from end to end thereof. These bars are substantially parallel for the most part, each being bent to form a substantially horizontal intermediate portion U', an upwardly inclined rear portion U², and an upwardly inclined forward portion U³. The front portions U³ converge and are rigidly joined by an apex casting B, providing a pivotal mount for a supporting caster wheel W. The rear portions U² are supported by a pair of arched frame pieces V and V', fixed thereto and mounted on a rear axle A, supported on wheels W. A plate N of sheet steel, fixed at its lower edge to the horizontal portion U' of one of the bars U⁷, rises vertically therefrom and at its upper edge is fixed to a bar U⁴. The forward portion U⁵ of bar U⁴ is bent downwardly and fixed to the casting B. A portion P of the plate N is bent outwardly and securely fixed to a platform R, for supporting the operator. This platform is supported by the portion P of the plate and by the frame pieces V and V', to which it is rigidly secured. The platform R, plate N, and bar U⁵ cooperate with the bars U to provide a truss-like structure of vertically rigid form.

A sheet metal tray T of heavy sheet steel extends lengthwise of the machine parallel with and above the inclined portions U² and horizontal portions U' of the bars U. This tray is securely fixed to the legs of the frame pieces V and V' and to the plate N and cooperate with the bars U to form a rigid box-like structure. The lower forward horizontal portion of the tray T cooperates with the vertical plate N to provide an appropriate corn receiving hopper S. The tray T is shaped to provide a floor 8 and upstanding integral side flanges 8' bent to provide longitudinal recesses t hereinafter referred to.

The tray constitutes a feedway through which ears of corn are advanced rearwardly and upwardly from the hopper S to and past the husking rolls 28 and 29 hereinafter described. The floor of the tray is corrugated to form a plurality of longitudinal ribs 9, which divide the feedway into a plurality of longitudinal feed channels 10. The width of each channel is preferably somewhat greater than the maximum diameter of an ear of corn, but not sufficiently wide to receive two ears side by side. In the machine shown two ribs 9 are provided so that three feed channels 10 are formed.

Figures 1, 2:
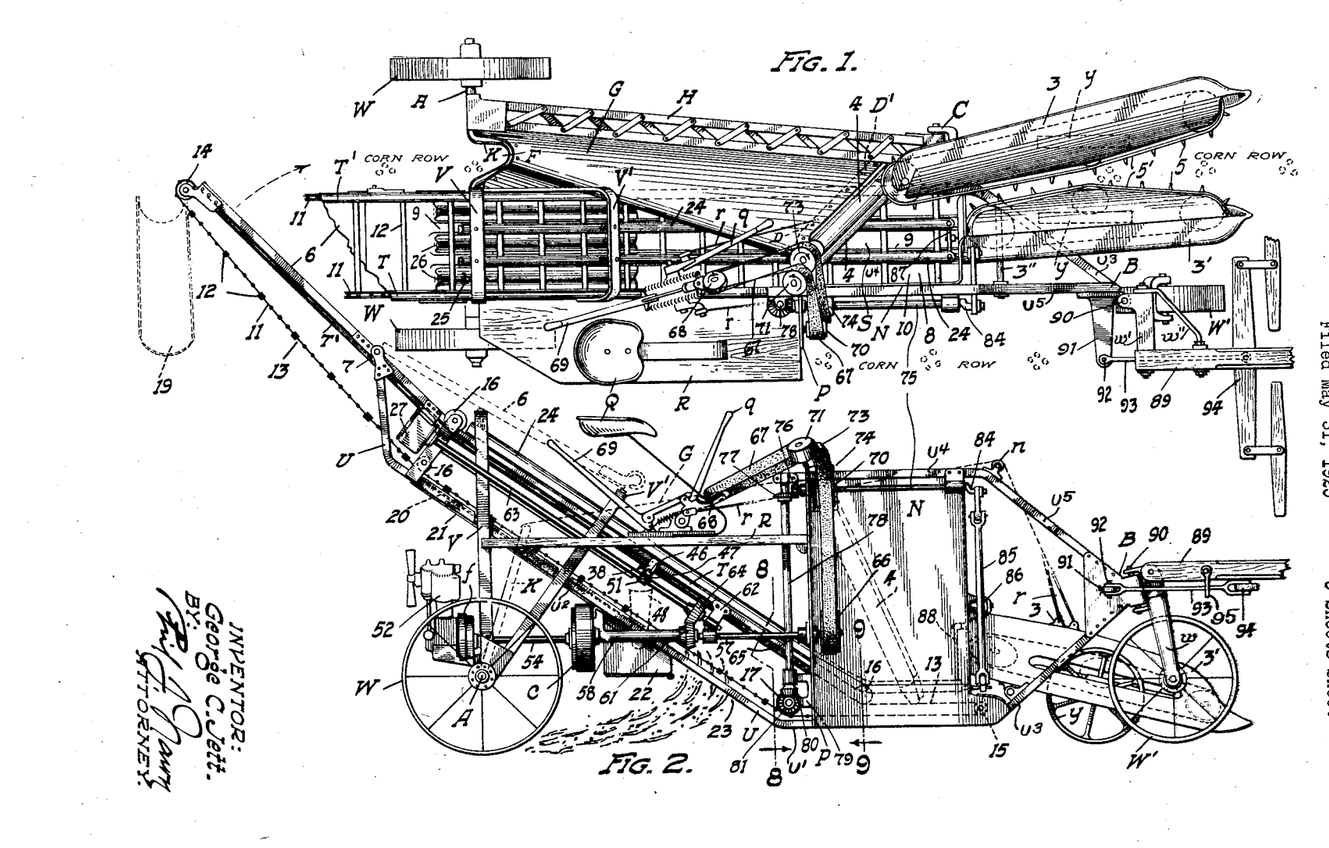
Figure 1 is a plan view of a corn picking and husking machine constructed in accordance with the present invention.
Fig. 2 is a side elevation.
Figures 3, 4:
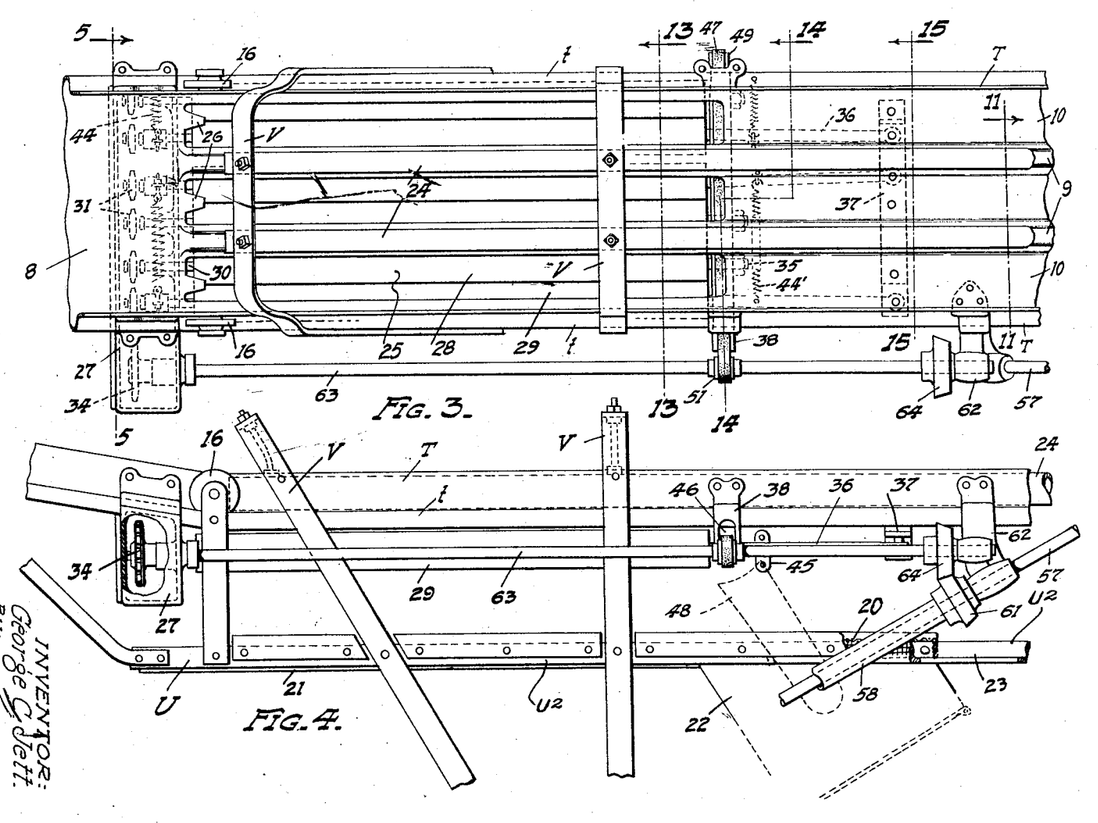
Fig. 3 is a top face view, on a larger scale of a portion of the feedway shown in Figures 1 and 2.
Fig. 4 is a side elevation of the parts shown in Figure 3.
Figures 5, 6, 7, 8, 9:
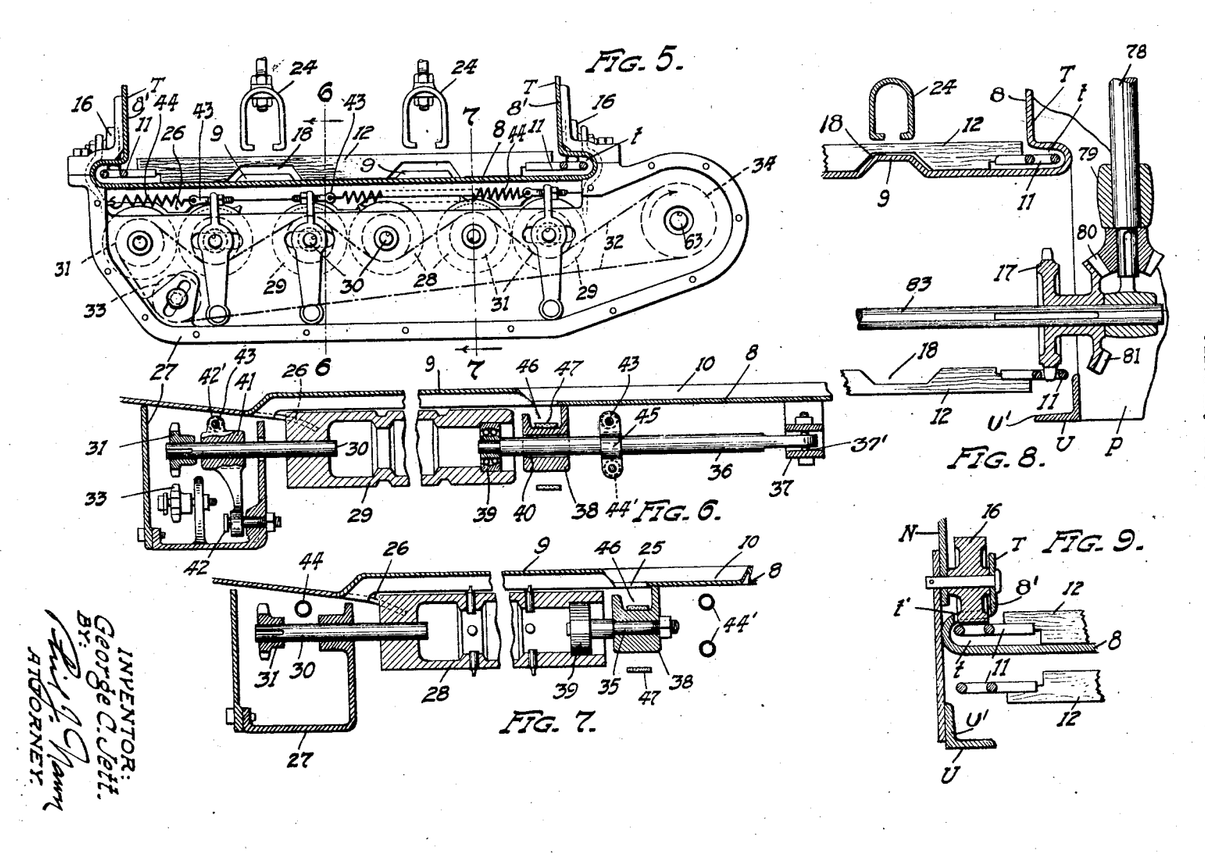
Fig. 5 is a transverse sectional view, on a larger scale, taken substantially along the line 5—5 of Figure 3.
Figs. 6 and 7 are sectional views taken substantially along the lines 6—6 and 7—7, respectively, of Figure 5.
Figs. 8 and 9 are fragmentary sectional views taken substantially along the lines 8—8 and 9—9, respectively, of Figure 2.
Figures 10, 11, 12, 17, 18, 19, 20:
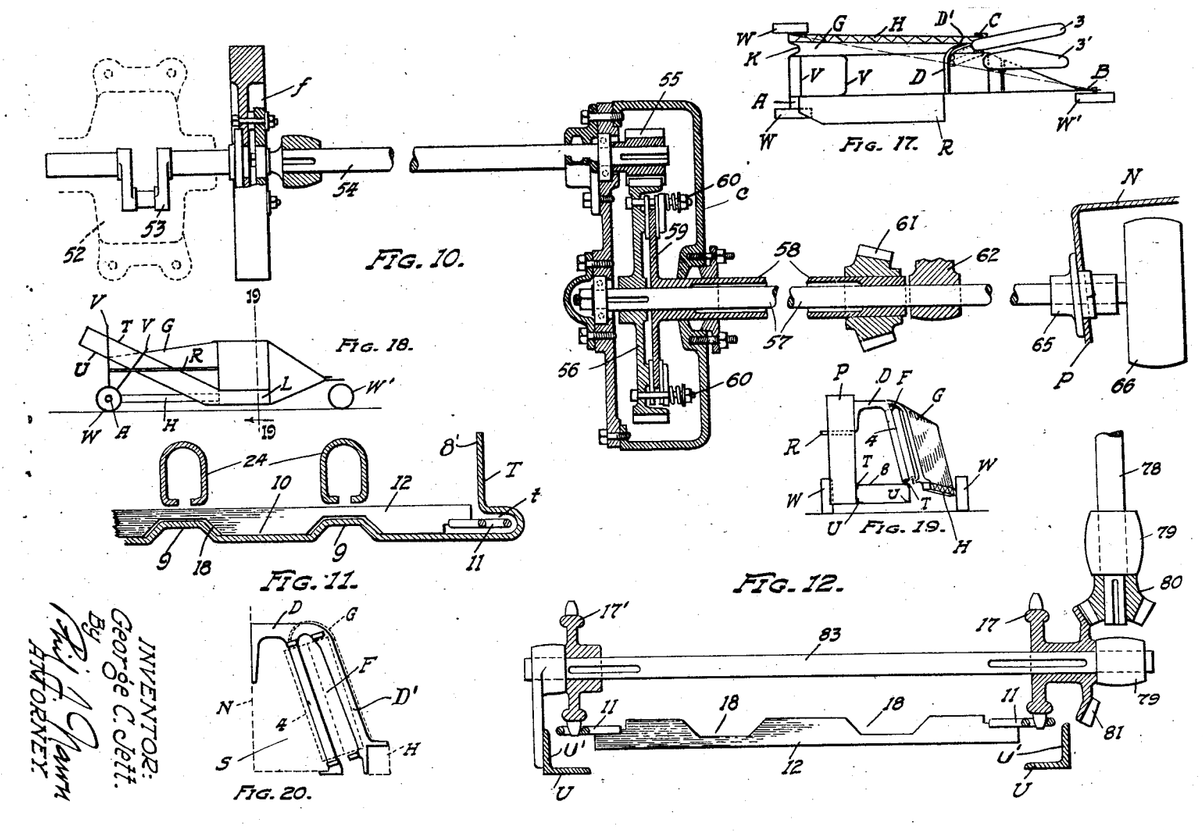
Fig. 10 is a view partly in section, and on a larger scale, of a portion of the drive mechanism shown in Figure 2.
Fig. 11 is a sectional view taken substantially along the line 11—11 of Figure 3.
Fig. 12 is a transverse sectional view through the lower run of the conveyor illustrating the drive mechanism therefor.
Figs. 17 and 18 are diagrammatic views, on a smaller scale, in plan and side elevation, respectively, of the machine.
Fig. 19 is a diagrammatic sectional view taken substantially along the line 19—19 of Figure 18.
Fig. 20 is a view of the casting for supporting the snapping rolls.
Figures 13, 14, 15, 16:
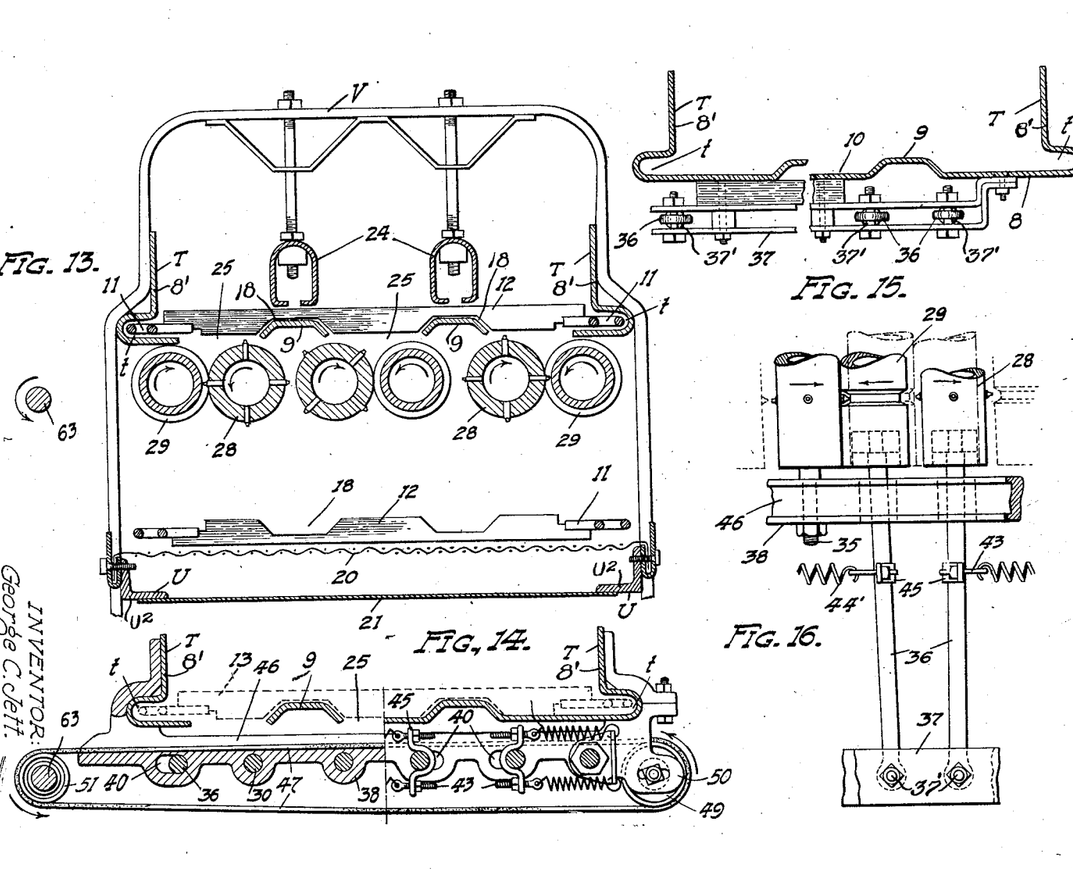
Figs. 13, 14 and 15 are sectional views taken substantially along the lines 13—13, 14—14, and 15—15, respectively, of Figure 3.
Fig. 16 is a detail view of the mounting means for the lower ends of the husking rolls.

An extension tray T' is preferably provided which forms in effect an upward continuation of the tray T. In the machine shown the extension tray T' is pivotally mounted on appropriate brackets 7, so that it may be swung and folded downwardly into the dotted line position shown of Figure 2 when the machine is not in use. The tray T' is similar to the tray T except that the floor 6 thereof is preferably plain.

The ears of corn are advanced from the hopper S upwardly along the trays by an appropriate endless conveyor 13. The conveyor shown comprises a series of slats 12 connected at their opposite ends to a pair of endless chains 11. Each chain is trained over end sprockets 14 and 15, respectively disposed at the upper rear end of extension tray T' and at the lower forward end of the main tray T, appropriate idler pulleys 16 being provided for guiding the chains. The upper stretches of the chains are disposed within the recesses t and the lower stretches are disposed beneath the trays adjacent the bars U. The chains are driven by sprockets 17 fixed to a transverse shaft 83 driven by mechanism to be hereinafter described. The arrangement is such that the slats 12 sweep upwardly along the floor of the tray, each slot having appropriate recesses 18 to accommodate the ribs 9.

Provision is preferably made for effecting an orderly distribution and alignment of the ears of corn within the several feed channels 10 during their upward travel through the tray T. In the machine shown this is effected by the use of a plurality of laterally vibrating bars 24. One of such bars is disposed above and parallel to each rib 9, immediately above the conveyor slats 12. They are supported at their upper ends by the frame pieces V and V' and project downwardly and forwardly into the bottom of the hopper S. Two such bars are shown. These bars are maintained in substantial parallelism by a link connection 87 at their forward ends. Depending rods 88, pivotally supported at their upper ends upon the front wall of hopper S provide a swinging support for the forward ends of the bars. The bars are actuated so as to vibrate laterally by any appropriate means, such as a lever 85, pivotally mounted intermediate its ends upon a fixed pivot 86, and connected at its lower end with an extension 24' of one of the bars. The lever 85 is driven through appropriate linkage from a crank 84 carried on the end of a shaft 75, supported by the plate N. This lateral vibration of the bars 24 jostles the ears of corn in the hopper, causing them to be aligned with and evenly distributed in the several feed channels 10, as they are advanced from the hopper upwardly along the inclined feedway. This jostling action decreases gradually as the ears approach the upper fixed ends of the bars during their upward travel through the feedway. As above pointed out, the feed channels 10 are of a width sufficient to accommodate only one ear at a time, and should two ears attempt to crowd side by side into a single channel, the jostling action of the bars 24 will loosen them and cause one to fall back along the incline until it finds an unoccupied space in the feed channel. Since the construction and operation of this distributor mechanism is fully described in my copending application, Serial No. 679,816, filed November 5, 1923, further description thereof at this time is deemed unnecessary.

Several pairs of husking rolls 28 and 29 are mounted immediately beneath the tray T adjacent the upper end thereof. Three pairs of rolls are provided in the machine shown, each pair being disposed beneath one of the three feed channels 10, the bottom of each feed channel being cut away so as to form an opening 25, through which the ears of corn are rendered accessible to the rolls. As the ears are advanced upwardly along the several channels the several pairs of rolls act thereon through the openings 25, and remove the husks therefrom in the usual manner, the husks passing downwardly between the rolls onto a screen 20 stretched across the bars U beneath the tray T. This screen terminates somewhat before the horizontal portions U' of the bars U are reached, so as to provide a discharge opening 23 through which the husks are ejected from the machine. The lower stretch of the conveyor 13 sweeps downwardly along and over this screen to thereby prevent clogging. A plate 21 extending between the bars U beneath the screen 20 intercepts any grains of corn that might have been removed in the husking process, and found their way through the screen 20. This plate leads downwardly to a receptacle 22, carried by the bars U, in position to receive the grains discharged from the plate.

The several husking rolls are supported at their upper ends on shafts 30 fixed thereto. Each shaft is driven by a sprocket wheel 31 fixed thereto and engaged with a sprocket chain 32 threaded over and under the several sprocket wheels 31, alternately, so that the rolls of each pair are driven in opposite directions. The chain is driven by an appropriate sprocket wheel 34, fixed to a shaft 63, an adjustable idler sprocket 33 being provided to take up slack in the chain. The several sprocket wheels 31, 33, and 34, and the chain 32 are preferably enclosed in an appropriate housing 27, fixed to and extending transversely beneath the tray T. The shafts 30 of rolls 28 are journalled in fixed bearings in the housing 27, but shafts 30 of rollers 29 are journalled in rockable bearing blocks 41, supported upon appropriate pivot pins 42 fixed in the housing. Appropriate springs 44 connected with anchor bolts 43, fixed in ears 42' of the several blocks 41, maintain a yielding pressure between the cooperating rolls of each pair. The lower ends of rolls 28 are supported by stub shafts 35 fixed in a transverse bar 38 fixed to and beneath the tray T. Each shaft 35 projects into an end of a roll and carries an appropriate roller bearing 39 fitted in the roll. A similar roller bearing 39 fitted in the end of each of the rolls 29 is carried by one end of a rod 36, loosely engaged in a slot 40 in bar 38. The other end of each rod 36 is supported upon a pivot pin 37', fixed in an appropriate transverse bracket 37 fixed to and beneath the tray T. Appropriate springs 44' connected through anchor bolts 43', with shackles 45 on the rods 36 maintain a yielding pressure between the lower ends of the rolls. The roller bearings 39 are of a well known type which will permit slight angular displacement between the rolls 29 and rods 36 without binding.

A pair of snapping rolls 4 are mounted at the forward part of the machine in such position that the ears, removed thereby from the standing stalks in the field, may fall by gravity into the horizontal forward portion of the tray T, constituting the bottom of the hopper S. The specific means for mounting these rolls is fully described in my copending application, Serial No. 708,867, filed April 28, 1924. It will suffice here to say that they are journalled at their upper ends in appropriate bearings supported in the upper portion of a casting D, rigidly secured to the vertical plate N, and cooperating therewith to form an arched structure. The casting D lies in a plane inclined rearwardly from the vertical, and the depending leg D' thereof projects laterally beyond the side of the main frame of the machine. A rigid girder H, fixed at its rear end to the axle A of the machine, is rigidly secured to the lower end D' of the casting to brace the same. The casting is further braced by an arched shell G, fixed at its forward end to the casting and at its outer lower edge to girder H. The shell G forms a passageway or tunnel F beside the main frame of the machine, through which the corn stalks pass as the machine advances through the field. The rear axle A of the machine is preferably arched, as at K to clear the stalks, and to reinforce the rear end of the shell G to which it is attached. Although the bottom of the shell G extends substantially parallel to the main frame of the machine, the top thereof extends diagonally from a point over the hopper S to the arched portion K of the axle at one side of the machine, so that the entrance to the shell is inclined laterally from the vertical while the rear end is substantially vertical. The snapping rolls 4 are disposed in front of the entrance to the shell, and direct the stalks into the shell after removing the ears therefrom. By inclining the rolls 4 laterally, in the manner indicated so as to overhang the bottom of the hopper, the ears removed thereby may fall directly into the hopper. The lower end of the outside roll is journalled in an appropriate bearing carried by the lower projecting leg D' of the casting, while the inner roll is journalled in an appropriate bearing carried by the side of the main frame of the machine. The rearward inclination of the rolls permits the lower receiving ends thereof to be positioned close to the ground with the upper ends high enough to overhang the hopper.

Appropriate stalk gathering mechanism is provided in advance of the snapping rolls for directing the stalks to the rolls. Gathering mechanism for this purpose is fully described in my co-pending application, Serial No. 679,817, filed December 10, 1923. It will suffice here to say that this mechanism includes two cooperating units 3 and 3' spaced apart to form a stalk feeding passage therebetween. A bracket C, fixed to the rear end of unit 3 and pivotally mounted on a horizontal shaft C' fixed in the forward end of girder H, provides a rockable connection between this unit and the machine. The rear end of the other unit 3' is also rockably connected to the machine through a horizontal shaft fixed to the forward portions U³ of bars U. Each of the units 3—3' is inclined forwardly and downwardly from its connection with the machine to a point close to the ground, each being supported by a wheel $y$ journalled intermediate the ends thereof. By supporting the units in this manner so as to enable them to accommodate themselves to the varying contour of the ground, they may be safely maintained closer to the ground than would be advisable otherwise. Both units may be lifted clear of the ground, whenever desired, by the use of cables $r$ attached thereto, and controlled by a hand lever $q$. These cables lead upwardly from the units, over sheaves $n$, and are connected to appropriate cranks controlled by the hand lever. Each unit 3—3' carries an endless feed chain 5' having appropriate fingers 5, which cooperate to feed the stalks of corn between the units to the snapping rolls 4. These chains are preferably driven from the supporting wheels $y$ through appropriate mechanism, such for instance, as that described in the application hereinabove last mentioned.

The snapping rolls 4, main conveyor 13, and husking rolls 28—29 are preferably driven from an appropriate motor 52 carried by the machine. The motor shown is a gasoline motor having a crank shaft 53 connected through an appropriate coupling $f$ with the main drive shaft 54. Shaft 54 carries a pinion 55, which meshes with a gear 56, fixed to a shaft 57. Pinion 55 and gear 56 are preferably enclosed in an appropriate housing $c$. Shaft 57 extends forwardly from housing $c$ through appropriate bearing brackets 62 and 65, and carries a pulley 66 at its forward end. The snapping rolls 4 and distributor bars 24 are driven from the pulley 66 through an appropriate belt 67. In the machine shown belt 67 passes from pulley 66, over an idler pulley 70, over a pulley 71 fixed to the upper end of one of the snapping rolls, around a belt tensioning pulley 68, over a pulley 73 fixed to the upper end of the other snapping roll, over a pulley 74 on the shaft 75, and thence back to the drive pulley 66. The pulley 68 is controlled by a lever 69 in a well known manner, through which the tension in belt 67 may be relieved, by the operator, whenever it is desired to stop the snapping rolls or distributor mechanism.

The shaft 63, which drives the husking rolls, is driven through cooperating gears 61 and 62 from a quill shaft 58, rotatably mounted on shaft 57. Shaft 58 is driven from gear 56 through an appropriate friction clutch 59 of a well known type disposed within the housing $c$. The husking rolls are thus continuously driven during normal operation, but in the event of a jam due to any cause, the friction clutch 59 protects the motor 52 against stalling.

From an inspection of Figures 3, 4, 6, 7 and 14 it will be noted that the bar 38 is disposed beneath the bottom of the tray T adjacent the lower ends of the husking rolls 28 and 29, and beneath the lower ends of the openings 25 through the floor of the tray. This bar is preferably channeled out as shown at 46 to receive any grains of corn that may fall through the openings 25 at this point. An endless belt conveyor 47 is so disposed that the upper run thereof travels through this channel and transmits any corn received therein to an appropriate chute 48, at the side of the machine. This chute directs this corn to the receptacle 22 hereinabove mentioned. The belt 47 is trained about two pulleys 49 and 51, pulley 49 being fixed to and driven by a shaft 63 hereinafter referred to.

The caster wheel W' at the front of the machine is journalled in the usual fork $w$, pivotally connected to the casting B through an upright pivot pin 90. The tongue 89 is rigidly connected to the fork $w$ through a lateral arm $w'$ and a brace member $w''$, so that the caster wheel W' swings with the tongue. A draft link 93 is connected to the frame of the machine independently of the tongue and caster wheel. The link 93 is shown connected, as at 92, to an arm 91 projecting laterally from the casting B. This link extends loosely through a guide loop 95 depending from the tongue and is attached at its forward end to the usual doubletree 94. By this construction the pivotal support for the caster wheel and tongue is free from the strains imposed by the draft mechanism. By this lateral disposition of the draft mechanism, the horses will not interfere with the row of corn stalks which is being operated upon by the machine.

In use the machine is driven through the field with the forward ends of the two gathering units straddling the row of corn stalks from which the ears are to be removed. It will be noted that the machine is so limited in width as to avoid interference with the next adjacent row. During the advance of the machine the gathering units direct the stalks in proper position to the snapping rolls 4, by which the ears are removed from the stalks and deposited directly into the hopper S. The stalks pass on between the snapping rolls and through the passage F, formed by the shell G, beside the main frame of the machine. The shell prevents interference between these stalks and the operating parts of the machine.

The ears thus received in the bottom of the hopper S are advanced upwardly through the tray T under the action of the slatted conveyor 13, and during this travel, are jostled by the distributing bars 24, and thereby arranged in orderly manner within the feed channels 10, in proper position to be acted on by the husking rolls 28—29. During continued advance they pass over the openings 25, where they are engaged and husked by the rolls 28—29, after which they proceed up through the extension tray T from which they discharge into and through an appropriate chute 19. Appropriate tongues 26 projecting downwardly toward the husking rolls 28—29 at the upper ends of the openings, serve to lift the husked ears from the rolls as they are advanced by the conveyor.

The husks pass between the husking rolls 28—29 onto the screen 20, and travel down the screen until they reach the opening 23 through which they are excluded from the machine. The screen 20 serves to separate the husks from any loose grain therein, such grain passing through the screen to the plate 21 and directed thereby to the receptacle 22. The conveyor belt 47 intercepts any grain that falls through the lower ends of the openings 25 and directs it through the chute 48 to the receptacle 22.

In making sharp turns in the field the gatherer units 3—3' are lifted clear of the ground through the cables $r$ and hand lever $q$. When the machine is not in use the extension tray T' is ordinarily folded over the body of the machine into the dotted line position of Figure 2.

Various changes may be made in the embodiment of the invention hereinabove specifically described without departing from or sacrificing any of the advantages of the invention as defined in the appended claims.

What is desired to claim and protect by Letters Patent, is:—

1. In a corn harvesting machine the combination of a relatively narrow frame, snapping rolls disposed at one side of said frame and inclined laterally and rearwardly over the forward portion thereof, husking rolls carried by said frame rearwardly of said snapping rolls, and a conveyor traveling lengthwise of said frame for receiving ears of corn discharged directly from said snapping rolls and delivering them directly to said husking rolls.

2. In a corn harvesting machine the combination of a relatively narrow frame having a feedway extending lengthwise thereof, snapping rolls arranged to discharge ears of corn into said feedway, husking rolls disposed beneath and substantially parallel with said feedway, and means associated with said feedway for advancing the ears received from said snapping rolls to and beyond said husking rolls.

3. In a corn harvesting machine the combination of a relatively narrow frame, means for advancing ears of corn lengthwise of said frame, snapping rolls arranged to deliver ears of corn directly to said advancing means, husking rolls arranged to receive the ears directly from said advancing means, and means associated with said advancing means for arranging the ears parallel to the direction of advance thereof.

4. In a corn harvesting machine the combination of a frame, snapping rolls carried thereby, said frame comprising a substantially horizontal portion for receiving ears of corn from said snapping rolls and an inclined portion leading upwardly from said horizontal portion, husking rolls associated with said inclined portion, and means for advancing ears of corn from said horizontal portion along said inclined portion to said husking rolls.

5. In a corn harvesting machine the combination of a frame, snapping rolls carried thereby, husking rolls carried thereby, a longitudinal feedway in said frame comprising a substantially horizontal portion associated with said snapping rolls and an inclined portion associated with said husking rolls, and ear advancing means traversing said horizontal and inclined portions.

6. In a corn harvesting machine the combination of a frame, snapping rolls carried thereby, a longitudinally extending feedway in said frame for receiving ears of corn from said snapping rolls, said feedway having a plurality of feed channels, a slot through the bottom of each channel, a pair of coacting husking rolls beneath each slot, and means traveling along said feedway for advancing the ears of corn received from said snapping rolls to and beyond said husking rolls.

7. In a corn harvesting machine the combination of a frame, snapping rolls carried thereby, a longitudinally extending feedway in said frame for receiving ears of corn from said snapping rolls, said feedway having a plurality of feed channels, a slot through the bottom of each channel, a pair of coacting husking rolls beneath each slot, means traveling along said feedway for advancing the ears of corn received from said snapping rolls to and beyond said husking rolls, and transversely vibrating means associated with said feedway for arranging the ears of corn lengthwise of said channels.

8. In a corn harvesting machine the combination of a feedway having a plurality of longitudinally extending ribs dividing said feedway into separate feed channels, husking rolls arranged substantially parallel to said channels for receiving ears of corn passing therethrough, laterally swinging bars disposed above said ribs for arranging the ears of corn parallel to said channels, means for swinging said bars, and means for advancing the ears lengthwise along said channels.

9. In a corn harvesting machine the combination of a feedway for ears of corn having a plurality of feed channels, laterally reciprocating means associated with said feedway for arranging the ears lengthwise in said channels, ear advancing means traveling lengthwise of said feedway, and a plurality of husking rolls associated with said feedway.

10. In a corn harvesting machine the combination of a feedway for ears of corn, said feedway having a plurality of parallel feed channels and longitudinally extending recesses at the sides of said feedway opening thereinto, an ear advancing means associated with said feedway comprising chains traveling in said recesses, and slats connecting said chains, said slats being shaped to project into said channels.

11. In a corn harvesting machine the combination of a feedway formed of sheet metal bent to provide side walls and longitudinally extending recesses beneath said walls, and a traveling conveyor associated with said feedway comprising chains traveling in said recesses and slats connecting said chains.

12. In a corn harvester an inclined feedway, means for advancing ears of corn upwardly along said feedway, and husking rolls beneath and substantially parallel with said feedway for husking the ears during the upward advance thereof.

13. In a corn harvester the combination of a plurality of pairs of husking rolls, supports for said rolls permitting relative lateral movement between the rolls of each pair, a drive sprocket for each of said rolls, a chain engaged with said sprockets above and below the same alternately, and means for driving said chain to rotate the rolls of each pair in opposite directions.

14. In a corn harvester the combination of a plurality of pairs of coacting husking rolls, supports for said rolls permitting relative lateral movement between the rolls of each pair, a drive sprocket for each of said rolls, and a driven chain engaged with said sprockets for driving said rolls.

15. In a corn harvester the combination of a feedway for ears of corn, a longitudinal slot in said feedway, a pair of husking rolls beneath said slot, ear advancing means traveling along said feedway, and a transverse conveyor extending transversely beneath one end of said slot to receive grains of corn that fall therethrough.

16. In a corn harvester the combination of a feedway having a plurality of feed channels, a longitudinal slot in each feed channel, a pair of husking rolls beneath each slot, means for advancing ears of corn along said channels, and a transverse conveyor beneath the ends of said slots for receiving grains of corn that fall therethrough.

17. In a corn harvester the combination of a frame mounted to travel through a field of corn, a longitudinally extending arched shell carried at one side of said frame and forming a passage for a row of corn stalks, and a pair of coacting snapping rolls disposed at the mouth of said passage.

18. In a corn harvester the combination of a frame mounted to travel through a field of corn, an arched structure mounted at the forward end of said frame and having a depending leg extending beyond the side thereof, a brace member extending rearwardly from the end of said leg, and a pair of laterally inclined snapping rolls carried by said structure.

19. In corn harvester the combination of a frame, an arched structure adjacent the rear of said frame at one side thereof, an arched structure adjacent the forward end of said frame, a pair of snapping rolls carried by said last named structure, and an arched shell connecting said arched structures.

20. In a corn harvesting machine the combination of a frame mounted to travel through a field of corn, an arched structure at the forward end of said frame, said structure including a depending leg projecting beyond the side of said frame, a brace member connected with the lower end of said leg and extending rearwardly thereof beside said frame, and stalk gathering means in front of said casting, said gathering means comprising two cooperating units, one unit being supported by said leg and the other being supported by said frame.

In testimony whereof I hereby affix my signature.

GEORGE C. JETT.